(12) United States Patent
Virkki et al.

(10) Patent No.: US 9,641,650 B2
(45) Date of Patent: May 2, 2017

(54) TCP PROXY SERVER

(75) Inventors: Vesa Virkki, Espoo (FI); Anzil Abdul Rasheed, Kochi (IN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 115 days.

(21) Appl. No.: 14/421,463

(22) PCT Filed: Aug. 23, 2012

(86) PCT No.: PCT/SE2012/050895
§ 371 (c)(1),
(2), (4) Date: Feb. 13, 2015

(87) PCT Pub. No.: WO2014/031046
PCT Pub. Date: Feb. 27, 2014

(65) Prior Publication Data
US 2015/0237173 A1 Aug. 20, 2015

(51) Int. Cl.
*G06F 15/173* (2006.01)
*H04L 29/06* (2006.01)
*H04L 12/26* (2006.01)
*H04L 29/08* (2006.01)

(52) U.S. Cl.
CPC ........ *H04L 69/163* (2013.01); *H04L 43/0864* (2013.01); *H04L 67/1095* (2013.01)

(58) Field of Classification Search
None
See application file for complete search history.

(56) References Cited

U.S. PATENT DOCUMENTS

| 7,225,266 B2 | 5/2007 | Ameigeiras et al. |
| 2013/0114408 A1* | 5/2013 | Sastry ............... H04W 28/02 370/231 |

FOREIGN PATENT DOCUMENTS

EP   1383281 A1   1/2004

OTHER PUBLICATIONS

Zhang et al. "Internetworking and Computing Over satellite Networks" Publication Date: 2003.*
Zenel et al. "A proxy based Filtering Mechanism for the Mobile Environment" Publication date : 1998.*
Allman, M. et al., "Ongoing TCP Research Related to Satellites", Network Working Group, RF02760, Feb. 2000, 1-46.
(Continued)

*Primary Examiner* — Joshua Joo
*Assistant Examiner* — Younes Naji
(74) *Attorney, Agent, or Firm* — Patent Portfolio Builders, PLLC

(57) ABSTRACT

In methods and devices for controlling a TCP proxy server, the TCP-proxy initial window size is set based on TCP RTT measurements. This is possible because the TCP proxy has knowledge about both sides Round Trip Time RTT values just after opening the TCP connections. The proxy can set its initial window size higher in the download case if it notices that the RTT in the link between the proxy and internet is shorter than the RTT in the other link, typically a wireless link. In the opposite case, when the RTT in the link between the proxy and internet is longer than the RTT in the other link, typically a wireless link, the TCP proxy can be configured to send more Acknowledgements (ACKs) to increase the internet TCP server congestion window size faster.

12 Claims, 4 Drawing Sheets

(56) References Cited

OTHER PUBLICATIONS

Allman, Mark et al., "Ongoing TCP Research Related to Satellites", Internet Engineering Task Force (IETF), Internet Draft, Sep. 1999, 1-40.

Hu, Liang, "TCP Performance Enhancement for UMTS Access Network", IEEE, 2008 Second International Conference on Future Generation Communication and Networking Symposia, Dec. 13-15, 2008, 100-105.

Meyer, Michael et al., "Performance Evaluation of the TCP Proxy in WCDMA Networks", IEEE Wireless Communications, Oct. 2003, 70-79.

Unknown, Author, "Performance-enhancing proxy", available online at http://en.wikipedia.org/wiki/Performance-enhancing_proxy, retrieved on Feb. 2, 2015, Dec. 25, 2014.

Unknown, Author, "Slow-start", available online at http://en.wikipedia.org/wiki/Slow-start, retrieved on Feb. 2, 2015, Dec. 28, 2014.

Office Action in EP application No. 12883394.4 mailed Sep. 24, 2015.

Cohen, R. et al. "Using proxies to enhance TCP performance over hybrid fiber coaxial networks," Computer Communications, vol. 20, No. 16, XP004113230, Jan. 1998, pp. 1502-1518.

Office Action in EP application No. 12883394.4 mailed Mar. 18, 2016.

\* cited by examiner

TCP PROXY SERVER

TECHNICAL FIELD

The present invention relates to methods and devices for use in a TCP Proxy server.

BACKGROUND

A Transmission Control Protocol (TCP)-proxy server (also termed TCP Proxy herein) provides a way to reduce objects download or upload time of data between two devices such as a server and a terminal.

The application of a TCP split connection proxy is well known and already often applied. Thus, split TCP is typically used to solve TCP problems with large Round Trip Times (RTTs). A typical system uses Split TCP Performance Enhancing Proxies (PEPs) to improve TCP performance over a link with different characteristics such as a satellite link. Split TCP functions by breaking the end-to-end connection into multiple connections and using different parameters to transfer data across the different legs. The end systems use standard TCP with no modifications, and do not need to know of the existence of the PEPs in between. Split TCP intercepts TCP connections from the end systems and terminates them. This allows the end systems to run unmodified and can overcome some problems with TCP window sizes on the end systems being set too low for satellite communications, see also http://en.wikipedia.org/wiki/Performance_Enhancing_Proxy.

Here it is assumed that the TCP-proxy splits an end-to-end TCP connection. In particular, with today's networks driven by a growth of wireless devices but still accessing internet servers connected over the wired access, the TCP-proxy can be used to split the end-to-end path into two parts—a wireless and wireline link. The gain with the TCP-proxy in this scenario would be from being able to independently handle TCP flows according to bandwidth latency etc. of respective links.

The TCP-proxy terminates a first TCP connection originating from a host in the Internet (or Intranet) and will use a second TCP connection towards the mobile client as shown in FIG. 1. See also EP 1383281, U.S. Pat. No. 7,225,266, and IETF DRAFT, RFC2760, http://tools.ietf.org/html/rfc2760#page-9

In a scenario such as the one illustrated in FIG. 1, a fixed initial window (IWD) size in TCP-proxy can cause that in download case in the internet TCP server IWD is smaller than in the TCP-proxy and then in TCP slow start phase this larger initial window size is useless, especially when latency between proxy and the internet is longer than latency between proxy and User Equipment (UE). Also the other way around, TCP-proxy buffer starts to increase because of shorter latency between proxy and the internet There is a constant desire to improve the performance in data communications. Hence, there exist a need for new methods and devices providing improved performance in TCP connections involving a TCP proxy server.

SUMMARY

It is an object of the present invention to provide improved methods and devices to address at least some of the problems as outlined above.

This object and others are obtained by the methods and devices as set out in the attached claims.

In accordance with some embodiments described herein the TCP-proxy initial window size is set based on TCP RTT measurements. This is possible because the TCP proxy has knowledge about both sides Round Trip Time RTT values just after opening the TCP connections. The proxy can set its initial window size higher in the download case if it notices that the RTT in the link between the proxy and internet is shorter than the RTT in the other link, typically a wireless link. In the opposite case, when the RTT in the link between the proxy and internet is longer than the RTT in the other link, typically a wireless link, the TCP proxy can be configured to send more Acknowledgements (ACKs) to increase the Internet TCP server congestion window size faster. Hereby a faster TCP transmission can be obtained.

In accordance with one embodiment method of controlling a Transport Control Protocol, TCP, Proxy server is provided. The TCP Proxy server acts as a proxy between a first device and a second device and is connected to the first device via a first connection and to the second device via a second connection. The method comprises obtaining round trips times, RTTs, to the first and second devices. When the first device is downloading data from the second device, the TCP proxy server is configured to have initial window size set to an increased value compared to a preconfigured default value if the RTT in the connection between the TCP proxy server and the second device is shorter than the RTT in the connection between the TCP proxy server and the first device. The first connection can be a wireless connection. The second connection can be a wireline connection. Also the first device can be a mobile station and the second device can be an Internet server or a local server.

Also, in accordance with one embodiment if the RTT in the connection between the TCP proxy server and the second device is longer than the RTT in the connection between the TCP proxy and the first device, the TCP proxy server can send more ACKs for received TCP packets compared to a preconfigured default value for the number of ACKs per received TCP packet. In particular one ACK per received TCP packet can be sent.

The invention also extends to a TCP Proxy server arranged to perform the above methods. The TCP Proxy server can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
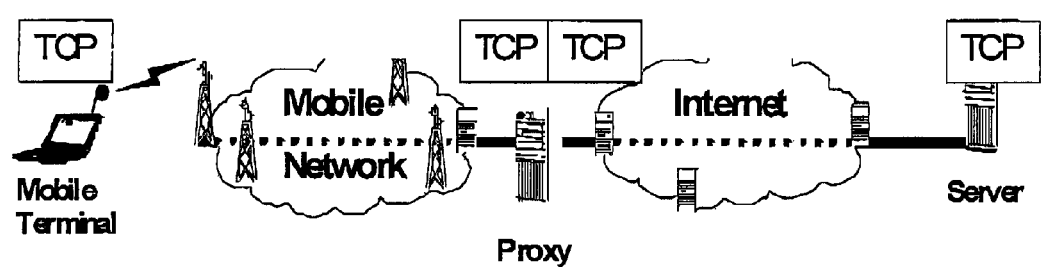
FIG. 1 is a view of a split TCP connection.
Figure 2:
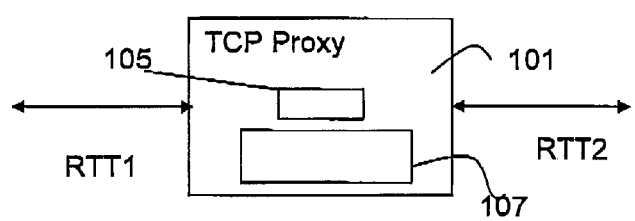
FIG. 2 is a view of a TCP Proxy server.

In FIG. 2 a general view of a TCP Proxy Server 101 is shown. The TCP proxy server 101 is used to split a TCP connection in two separate TCP connections. This is shown by the two arrows terminating in the Server 101. Each of the split TCP connections originating/terminating in the TCP proxy server is associated with a Round Trip Time (RTT). These RTTs are designated RTT1 and RTT2 in FIG. 2. The Proxy Server 101 comprises controllers/controller circuitry 105 for providing functionality of the Proxy server 101. The controller 105 can for example comprise suitable hardware and or software. The hardware can comprise one or many processors that can be arranged to execute software stored in a readable storage media 107. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

In the beginning of the TCP connection RTT is the only limiting factor if the link capacity is not very narrow. After handshake the TCP sender sends a number of packets that is equal to the Initial window (IWD) size. A typical setting for IWD is 3 TCP packets with size 1460 bytes. After that this TCP end point is set to wait until it receives an ACK. When an ACK is received, the PCP sender increase its Congestion Window size (CWND) by one of each ACK in TCP slow start phase. Slow-start is part of the congestion control strategy used by TCP, the data transmission protocol used by many Internet applications. Slow-start is used in conjunction with other algorithms to avoid sending more data than the network is capable of transmitting, that is, to avoid causing network congestion, see also http://en.wikipedia.org/wiki/Slow-start.

Nowadays TCP-connection uses delayed ACK. Thus, the TCP only sends an ACK directly when two packets have arrived otherwise there will be a delay time before sending ACK from the reception of a first TCP data packet.

Also in some cases a TCP servers is configured so that after connection is terminated the server is left in an open mode for some time and the next time someone want to use same server, the connection between the TCP proxy and the TCP server avoid slow start because the congestion window size is left with the value from the previous connection.

Typically in future wireless network the latency between TCP-proxy and UE is expected to be shorter than the latency between the TCP proxy and an internet server except for intranet or cached data. However, in all scenarios the TCP proxy server has knowledge of both sides RTT values (this corresponds to RTT1 and RTT2 in the exemplary server depicted in FIG. 2), because of TCP opening three way handshakes. Using the information from the opening handshakes the TCP proxy can sends more ACKs to the internet server at the beginning of TCP connection and come back to the "normal" TCP behavior step by step based on buffer size in TCP proxy and also new RTT measurements. The proxy can also increase its CWND value faster to reach one of the TCP link capacity limit.

Figure 3:
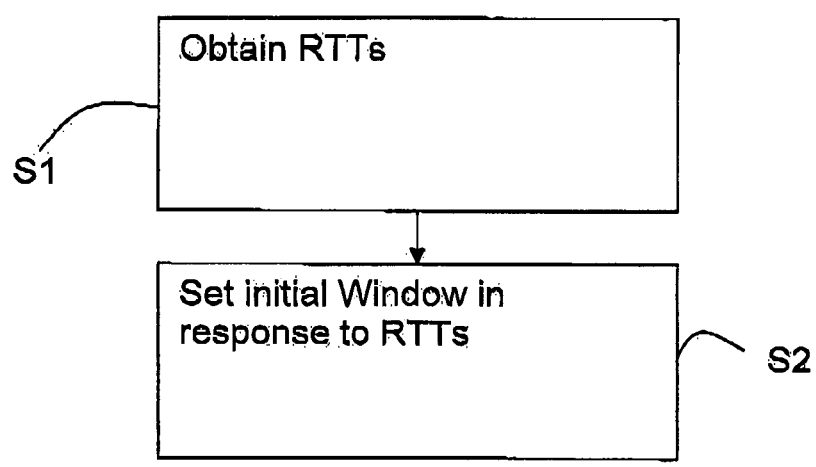
FIGS. 3-5 are flow charts illustrating some steps to be performed in a TCP proxy server.

In accordance with some embodiments the TCP-proxy initial window size is set based on TCP RTT measurements. This is possible because the TCP proxy has knowledge about both sides Round Trip Time RTT values just after opening the TCP connections. The TCP proxy can set its initial window size higher in the download case if it notices that the RTT in the link between the proxy and internet is shorter than the RTT in the other link, typically a wireless link. This is illustrated in FIG. 3. Thus first in s a step S1 a TCP proxy server obtains the Round trips times for the two devices for which it acts as a TCP Proxy server. The TCP Proxy server is connected to a first device over a first TCP connection and to a second device over a second TCP connection, where the first device is downloading data from the second device. In accordance with some embodiments the first device is a mobile terminal to which the TCP proxy server is connected over a wireless connection. In accordance with some embodiments the second device is a device accessed over a wireline connection. The second device can for example be an Internet server or a local server. Then in a step S2 if the RTT in the connection between the TCP proxy and the second device is shorter than the RTT in the connection between the TCP proxy and the first device, the TCP proxy is configured to set its initial window size to an increased value compared to a preconfigured default value.

In the opposite case, when the RTT in the link between the proxy and internet is longer than the RTT in the other link, typically a wireless link, the TCP proxy can be configured to send more ACKs to increase the internet TCP server congestion window size faster.

Figure 4:
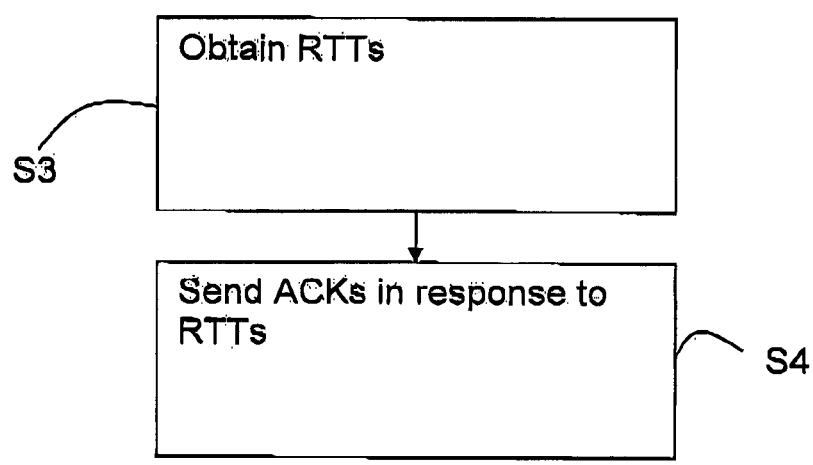
Figure 5:
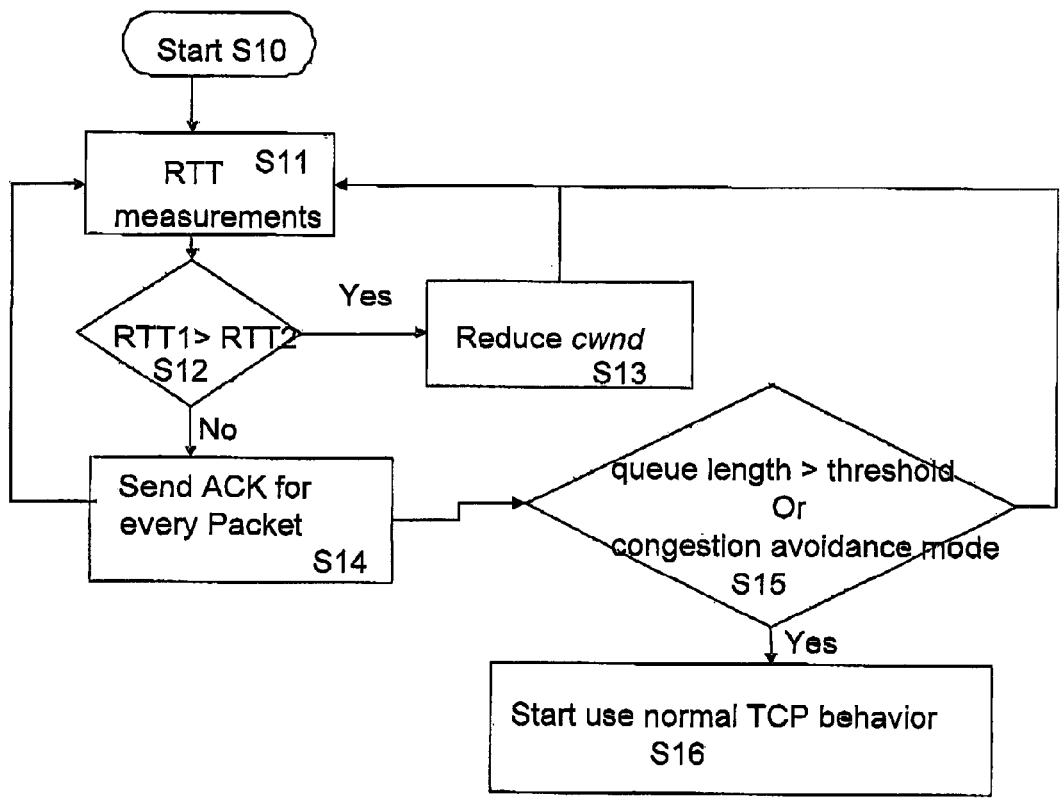

This is illustrated in FIG. 4. Thus first in s a step S3 a TCP proxy server obtains the Round trips times for the devices for which it acts as a Proxy server. The TCP Proxy server is connected to a first device over a first connection and to a second device over a second connection, where the first device is downloading data from the second device. In accordance with some embodiments the first device is a mobile terminal to which the TCP proxy server is connected over a wireless connection. In accordance with some embodiments the second device is a device accessed over a wireline connection. The second device can for example be an Internet server or a local server. Then in a step S4 if the RTT in the connection between the TCP proxy and the second device is longer than the RTT in the connection between the TCP proxy and the first device, the TCP proxy is configured to send more ACKs compared to a preconfigured default value for the number of ACKs.

Below another exemplary embodiment is illustrated where a TCP proxy server splits a TCP connection into two. RTT1 here denotes the RTT in a first half of the split TCP connection of the TCP proxy server. The first split TCP connection can be a wireless link such as between a UE and TCP-proxy. RTT2 denotes the RTT in the second half of the split TCP connection. The second split TCP connection can be a wireline connection between in the TCP-proxy and TCP server, which can be located in the internet or in a local network. First, in a step S11 the TCP-proxy gets an initial value of RTT2 in down load case just after SYN-SYNACK and an initial value of RTT1 just after SYNACK-Data Request. When the values for RTT1 and RTT2 have been obtained the TCP proxy performs a comparison between the RTT1 and RTT2 in a step S12. If RTT1 is shorter than RTT2, the TCP proxy is configured to remove the delayed ACK function in a step S14 by sending more ACKs than in the delayed ACK function. As set out above delayed ACK means that TCP send ACK only every second TCP packets except if time between two TCP data packets are too long (typically 200 ms) In particular one ACK per received packet is sent during the delayed ACK function in Step S14. The procedure of Step S14 is continued as long as RTT1 is shorter than RTT2 until one of the TCP connections go to congestion avoidance mode or the queue length in TCP-proxy is longer than some threshold value as determined in a step S15. At the same time the sender side of TCP-proxy can also use a less aggressive congestion window size, to keep both TCP connections in balance.

If RTT2 is shorter than RTT1 as determined in step S12, the TCP proxy can be configured to use an aggressive initial window size in the sender side to reducing down load time in a step S13.

The invention claimed is:

1. A method of controlling a Transport Control Protocol (TCP) proxy server, the TCP proxy server acting as a proxy between a first device and a second device and connected to the first device via a first connection and to the second device via a second connection, the method comprising the steps of:
   obtaining round trip times (RTTs) to the first and second devices;
   determining a RTT to the second device is shorter than a RTT to the first device at a first time;
   when the first device is downloading data from the second device, configuring the TCP proxy server to set an initial window size to an increased value compared to a preconfigured default value when the RTT to the second device is shorter than the RTT to the first device at the first time;
   determining a RTT to second device is longer than a RTT to the first device at a second time; and
   when the RTT to the second device is longer than the RTT to the first device at the second time, the TCP proxy server is configured to send more acknowledgements (ACKs) for received TCP packets compared to a preconfigured default value for a number of ACKs sent per received TCP packet.

2. The method according to claim 1, wherein the first connection is a wireless connection.

3. The method according to claim 1, wherein the second connection is a wireline connection.

4. The method according to claim 1, wherein the first device is a mobile station.

5. The method according to claim 1, wherein the second device is an Internet server or a local server.

6. The method according to claim 1, wherein the preconfigured default value for the number of ACKs sent per received TCP packet is one ACK per received TCP packet.

7. A Transport Control Protocol (TCP) proxy server, the TCP proxy server being configured to act as a proxy between a first device and a second device and connected to the first device via a first connection and to the second device via a second connection, the TCP proxy server comprising:
   a controller circuitry configured to:
   obtain round trip times (RTTs) to the first and second devices;
   when the first device is downloading data from the second device, configure the TCP proxy server to set an initial window size to an increased value compared to a preconfigured default value when the RTT to the second device is shorter than the RTT to the first device; and
   when the RTT to the second device is longer than the RTT to the first device, the TCP proxy server is configured to send more acknowledgements (ACKs) for received TCP packets compared to a preconfigured default value for a number of ACKs sent per received TCP packet.

8. The TCP proxy server according to claim 7, wherein the first connection is a wireless connection.

9. The TCP proxy server according to claim 7, wherein the second connection is a wireline connection.

10. The TCP proxy server according to claim 7, wherein the first device is a mobile station.

11. The TCP proxy server according to claim 7, wherein the second device is an Internet server or a local server.

12. The TCP proxy server according to claim 7, wherein the preconfigured default value for the number of ACKs sent per received TCP packet is one ACK per received TCP packet.

* * * * *